United States Patent
Kondou et al.

[11] Patent Number: 5,945,813
[45] Date of Patent: Aug. 31, 1999

[54] SINGLE OR ISOLATED OPERATION DETECTING APPARATUS FOR A DISTRIBUTED POWER SUPPLY

[75] Inventors: Kouji Kondou; Jun Motohashi, both of Tokyo; Chikashi Nakazawa, Kawasaki, all of Japan

[73] Assignee: Tokyo Electric Power Co., Inc., Tokyo, Japan

[21] Appl. No.: 09/062,731

[22] Filed: Apr. 20, 1998

Related U.S. Application Data

[63] Continuation-in-part of application No. 08/819,844, Mar. 17, 1997, abandoned, and a continuation-in-part of application No. 08/819,845, Mar. 17, 1997, abandoned.

[30] Foreign Application Priority Data

Mar. 18, 1996 [JP] Japan .................................. 8-060714
Mar. 18, 1996 [JP] Japan .................................. 8-060715

[51] Int. Cl.[6] ................................................ G05F 1/70
[52] U.S. Cl. ........................................ 323/205; 323/207
[58] Field of Search .................................. 323/205, 207, 323/208, 209

[56] References Cited

U.S. PATENT DOCUMENTS

| | | | |
|---|---|---|---|
| 4,857,821 | 8/1989 | Takeda | 323/210 |
| 5,438,253 | 8/1995 | Aritsuka et al. | 323/207 |
| 5,485,075 | 1/1996 | Mori et al. | 323/207 |
| 5,631,545 | 5/1997 | Norman et al. | 323/205 |
| 5,734,257 | 3/1998 | Schauder et al. | 323/207 |
| 5,808,880 | 9/1998 | Marvin | 363/37 |

*Primary Examiner*—Matthew Nguyen
*Attorney, Agent, or Firm*—Venable; Robert J. Frank; Allen Wood

[57] ABSTRACT

The invention is directed to an apparatus for detecting if a distributed power supply is switched from cooperation with another power system to isolated or single operation. The distributed power supply includes a synchronous generator and possibly also another power source such as an induction generator. The single operation detecting apparatus includes a frequency detector connected to a line system of a customer, reactive power regulating equipment connected to the distributed power supply, a fluctuation signal generator for providing periodic small fluctuations to a reactive power setter of the reactive power regulating equipment, and a single operation signal generator for monitoring the output of the frequency detector to output a single operation signal when the monitored output deviates from a range between allowable upper and lower limits around a reference frequency. It is possible to detect the isolated or single operation mode by actively disturbing the balance between the energy generated by the distributed power supply and the power consumed by the distributed power supply, when the distributed power supply disconnected from the cooperation with power system.

24 Claims, 13 Drawing Sheets

SINGLE OR ISOLATED OPERATION DETECTING APPARATUS FOR A DISTRIBUTED POWER SUPPLY

CROSS-REFERENCE TO RELATED APPLICATIONS

This is a continuation-in-part of application Ser. No. 08/819,844 and application Ser. No. 08/819,845, both filed on Mar. 17, 1997. The disclosures of these parent applications are incorporated herein by reference.

BACKGROUND OF THE INVENTION

1. Field of the Invention

The present invention relates to an apparatus for detecting whether a synchronous generator of a distributed power supply source, in a system where the distributed power supply source is able to cooperate with a commercial power system, has been separated from cooperation with the power system and has entered into what will be called isolated or single operation. The present invention also related to such a single operation detecting apparatus when the distributed power supply source includes both a synchronous generator and an induction generator.

2. Description of Related Art

Conventionally, a single operation detecting apparatus of this type detects the single operation of the distributed power supply by means of what will be called transfer breaking or by monitoring a voltage or frequency. These methods will be explained with reference to FIGS. 8A and 8B.

FIG. 8A is a block diagram showing a conventional single operation detecting apparatus. In FIG. 8A, reference numeral 10 designates a commercial power system whose generator 11 and a transmission line 12 are connected to a customer 20 through a system circuit breaker 13.

A synchronous generator 21 of the customer 20 is connected to the commercial power system 10 through a circuit breaker 22 for the synchronous generator and an interrupter or circuit breaker 23 on the side of the detection apparatus, so that the synchronous generator cooperates with the power system 10. A station service load 30 of the customer 20 is connected to the commercial power system 10 through a circuit breaker 31 for the station service load and the circuit breaker 23 for the detecting apparatus, as well as to the synchronous generator 21 through the circuit breaker 31 and the circuit breaker 22. Likewise, an external load 32 of the customer 20 is connected to the commercial power system 10 through a circuit breaker 33 for the external load, as well as to the synchronous generator 21 through the circuit breaker 23 and the circuit breaker 22.

The synchronous generator 21 of the customer 20 can be connected to the commercial power system 10 to operate in parallel with the commercial power system. The transfer breaking method can be used to detect when single operation begins. The single operation may be started when the system circuit breaker 13 of the commercial power system 10 is opened, and the synchronous generator 21 of the customer 20 is switched to the single operation mode from the mode of cooperation with the commercial power system 10. In this case, the circuit breaker 23 and the circuit breaker 33 are opened by a transfer breaking signal 14 from the commercial power system 10. This transfer breaking signal 14 can thus be used to detect when single operation of the generator 21 begins.

On the other hand, in the method for detecting single operation by monitoring the voltage or frequency, the voltage detected by a voltage detector 40 which is connected to the line system of the customer 20 as shown in FIG. 8A, or the frequency detected by a frequency detector 41, is supplied to a single operation detector 42. In other words, this method detects the single operation in a passive manner by monitoring variations in the voltage or frequency on the line system of the customer 20 by means of the single operation detector 42.

These conventional single operation detecting apparatuses, however, have the following problems. First, the method for detecting single operation by means of transfer breaking requires a dedicated line for transmitting the transfer breaking signal 14. This presents a problem in that a dedicated line with larger capacity will be demanded as the number of distributed power supplies increases in the future. In addition, using a shared line or radio for conveying the transfer breaking signal 14 is not practical and also not economical.

Second, the method for detecting single operation by monitoring the voltage or frequency has a problem in that it is impossible to detect such when no current flows between the commercial power system 10 and the customer 20 in the balanced state in which the total power consumed by the load of the customer 20, that is, the sum total of the external load 32 and the station service load 30, is balanced with the total amount of energy generated by the synchronous generator 21.

FIG. 8B illustrates a conventional single operation detection apparatus when the distributed power supply source includes more than a synchronous generator. In FIG. 8B, elements corresponding to those shown in FIG. 8A bear the same reference numbers and will not be further discussed.

In FIG. 8B, an induction generator 34 of the customer 20 is connected to the commercial power system 10 through an induction generator breaker 35 and the circuit breaker 25. The synchronous generator 21 and the induction generator 34 are operated in parallel by a known technique, and constitute a distributed power supply. An induction generator station service load 36 of the customer 20 is connected to the commercial power system 10 through a circuit breaker 37 for the service station load and the circuit breaker 25, as well as to the induction generator 34 through the circuit breaker 37 and the circuit breaker 35.

The induction generator 34 and the synchronous generator 21 of the customer 20 may be operated in parallel with the commercial power system 10. The single operation detection apparatus detects when the generators 21 and 34 are separated from the commercial system 10 and enter into the single operation mode. As in the arrangement shown in FIG. 8A, the transfer breaking method can be used to detect when single operation begins. The single operation mode may be started when the circuit breaker 13 of the commercial power system 10 is opened, and the induction generator 34 and the synchronous generator 21 of the customer 20 are switched into single operation and cease cooperating with the commercial power system 10. The circuit breaker 23 of the circuit breaker 35 of the customer 20 are opened by the transfer signal 14, which thus provides a way of detecting when single operation begins.

As was also the case in FIG. 8A, the voltage or frequency appearing on the line system of the customer 20 may be monitored to detect single operation of the generators 21 and 34. The voltage detector 40 or the frequency detector 41 may be used for this purpose with the output being supplied to the single operation detector 42.

The conventional arrangement shown in FIG. 8B suffers from the same problems that were discussed above with respect to FIG. 8A. Specifically, the method for detecting single operation by means of transfer breaking requires a dedicated line for transmitting the transfer breaking signal 14. This presents a problem in that a dedicated line with larger capacity will be demanded as the number of distributed power supplies increases in the future. In addition, using a shared line or radio for conveying the transfer breaking signal 14 would not be practical.

Moreover, the method for detecting single operation by monitoring the voltage or frequency has the problem that it is impossible to detect such when no current flows between the commercial power system 10 and the customer 20 under the balance state in which the total power consumed by the loads of the customer 20 (that is, the sum total of the external load 32, the induction generator station service load 36, and the synchronous generator service station load 32) is balanced with the total amount of energy generated by the induction generator 34 and the synchronous generator 21.

SUMMARY OF THE INVENTION

It is therefore an object of the present invention to provide a single operation detecting apparatus for a synchronous generator, or for a synchronous generator and another power source such as an induction generator, that can solve the foregoing problems.

In a first aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

reactive power regulating equipment connected to an output terminal of the distributed power supply:

a fluctuation signal generator for providing a reactive power setter of the reactive power regulating equipment with periodic small fluctuations;

a frequency detector for detecting one of a frequency at a receiving end and a frequency of the distributed power supply; and a single operation signal generator for generating a single operation signal when a difference between an output of the frequency detector and a predetermined reference frequency deviates from a predetermined range, while the fluctuation signal generator continually provides the small fluctuations to reactive power at the receiving end.

Here, the reactive power regulating equipment may include a static reactive power compensator.

The reactive power regulating equipment may include an active filter apparatus.

In a second aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

reactive power regulating equipment connected to an output terminal of the distributed power supply:

a fluctuation signal generator for providing a reactive power setter of the reactive power regulating equipment with periodic small fluctuations;

a frequency detector for detecting one of a frequency at a receiving end and a frequency of the distributed power supply;

an amplifier circuit for monitoring small fluctuations in an output of the frequency detector, and for amplifying an output of the fluctuation signal generator for a predetermined short duration when the output of the frequency detector deviates from a range between a predetermined upper limit and a predetermined lower limit; and a single operation signal generator for generating a single operation signal when a difference between the output of the frequency detector and a predetermined reference frequency deviates from a predetermined range, while the amplifier circuit and the fluctuation signal generator continually provide the small fluctuations to reactive power at the receiving end.

Here, the reactive power regulating equipment may include a static reactive power compensator.

The reactive power regulating equipment may include an active filter apparatus.

In a third aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

reactive power regulating equipment connected to an output terminal of the distributed power supply:

a fluctuation signal generator for providing a reactive power secter of the reactive power regulating equipment with periodic small fluctuations;

a frequency detector for detecting one of a frequency at a receiving end and a frequency of the synchronous generator;

a delay amplifier circuit for monitoring small fluctuations in an output of the frequency detector, for activating a timer when the output of the frequency detector deviates from a range between a predetermined upper limit and a predetermined lower limit, and for amplifying an output of the fluctuation signal generator for a predetermined short duration when the timer counts a predetermined time period; and a single operation signal generator for generating a single operation signal when a difference between the output of the frequency detector and a predetermined reference frequency deviates from a predetermined range, while the delay amplifier circuit and the fluctuation signal generator continually provide the small fluctuations to reactive power at the receiving end.

Here, the reactive power regulating equipment may include a static reactive power compensator.

The reactive power regulating equipment may include an active filter apparatus.

In a fourth aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

a fluctuation signal generator for providing a reactive power setter of phase modifying equipment of the distributed power supply with periodic small fluctuations;

a frequency detector for detecting one of a frequency at a receiving end and a frequency of the distributed power supply; and a single operation signal generator for generating a single operation signal when a difference between an output of the frequency detector and a predetermined reference frequency deviates from a predetermined range, while the fluctuation signal generator continually provides the small fluctuations to reactive power at the receiving end.

In a fifth aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

a fluctuation signal generator for providing a reactive power setter of phase modifying equipment of the distributed power supply with periodic small fluctuations;

a frequency detector for detecting one of a frequency at a receiving end and a frequency of the distributed power supply;

an amplifier circuit for monitoring small fluctuations in an output of the frequency detector, and for amplifying an output of the fluctuation signal generator for a predetermined short duration when the output of the frequency detector deviates from a range between a predetermined upper limit and a predetermined lower limit; and a single operation signal generator for generating a single operation signal when a difference between the output of the frequency detector and a predetermined reference frequency deviates from a predetermined range, while the amplifier circuit and the fluctuation signal generator continually provide the small fluctuations to reactive power at the receiving end.

In a sixth aspect of the present invention, there is provided a single operation detecting apparatus for detecting whether a distributed power supply has entered into a single operation mode and no longer cooperates with a power system, the distributed power supply including a synchronous generator and possibly also an additional power source such as an induction generator which operates in parallel with the synchronous generator to feed power to a load, the single operation detecting apparatus comprising:

a fluctuation signal generator for providing a reactive power setter of phase modifying equipment of the distributed power supply with periodic small fluctuations;

a frequency detector for detecting one of a frequency at a receiving end and a frequency of the distributed power supply;

a delay amplifier circuit for monitoring small fluctuations in an output of the frequency detector, for activating a timer when the output of the frequency detector deviates from a range between a predetermined upper limit and a predetermined lower limit, and for amplifying an output of the fluctuation signal generator for a predetermined short duration when the timer counts a predetermined time period; and a single operation signal generator for generating a single operation signal when a difference between the output of the frequency detector and a predetermined reference frequency deviates from a predetermined range, while the delay amplifier circuit and the fluctuation signal generator continually provide the small fluctuations to reactive power at the receiving end.

According to the present invention, periodic small fluctuations are given to a reactive power regulator which is newly provided at the output of at least one of a synchronous generator and another power source such as an induction generator of a distributed power supply which cooperates with a power system, or to a reactive power setter in phase modifying equipment, so that the reactive power at the receiving end varies periodically. This enables the distributed power supply to detect the single operation mode of the distributed power supply by monitoring for frequency variations. In short, the single operation detecting apparatus detects the single operation mode by actively disturbing the balanced state between the generated energy and the consumed power of the distributed power supply by providing its reactive power output with periodic small fluctuations.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Several embodiments of an isolated or single operation detecting apparatus will now be described with reference to the accompanying drawings.

EMBODIMENT 1

Figure 1A:
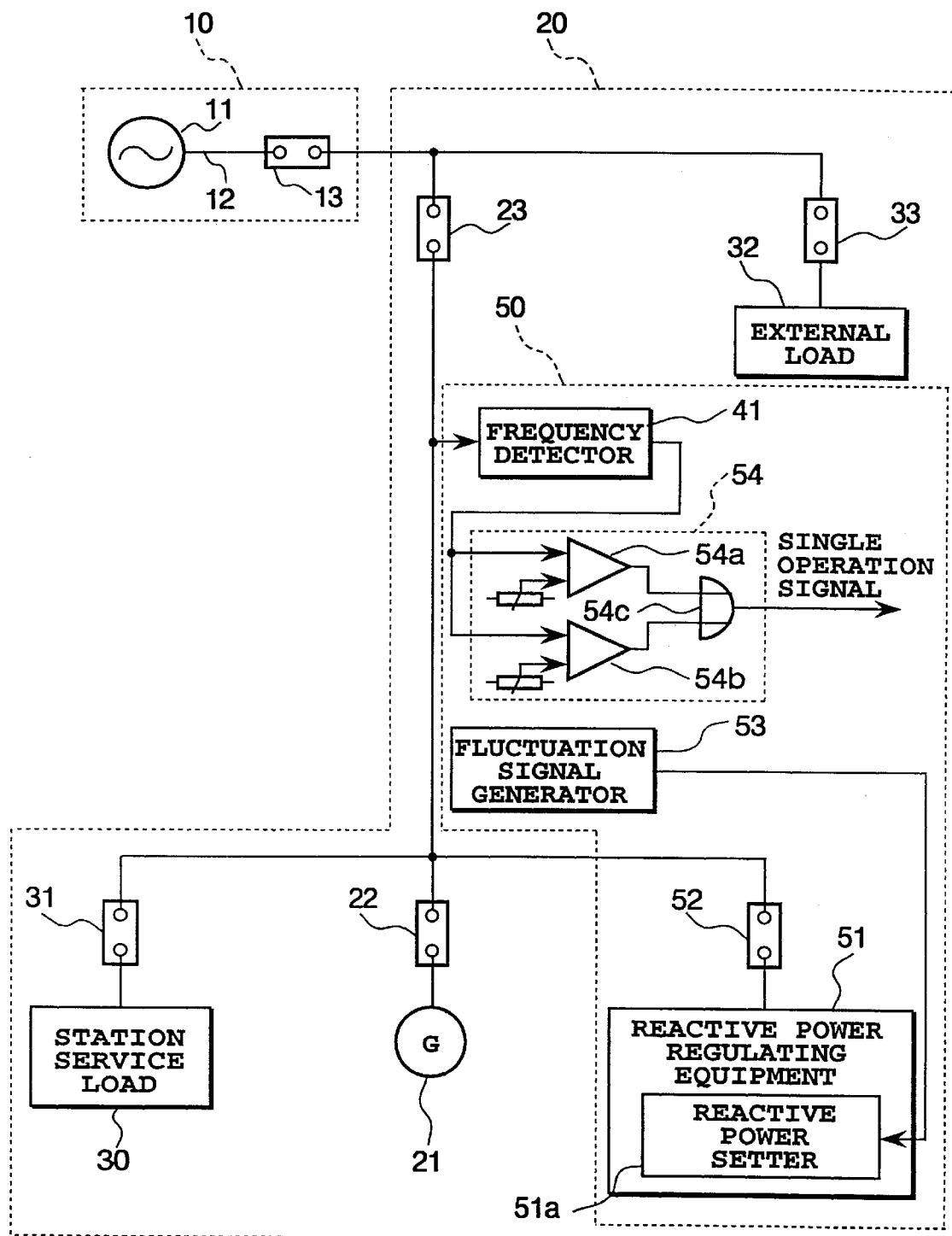
FIGS. 1A and 1B are block diagrams showing two examples of a first embodiment of a single operation detecting apparatus for a distributed power supply in accordance with the present invention.
Figure 8A:
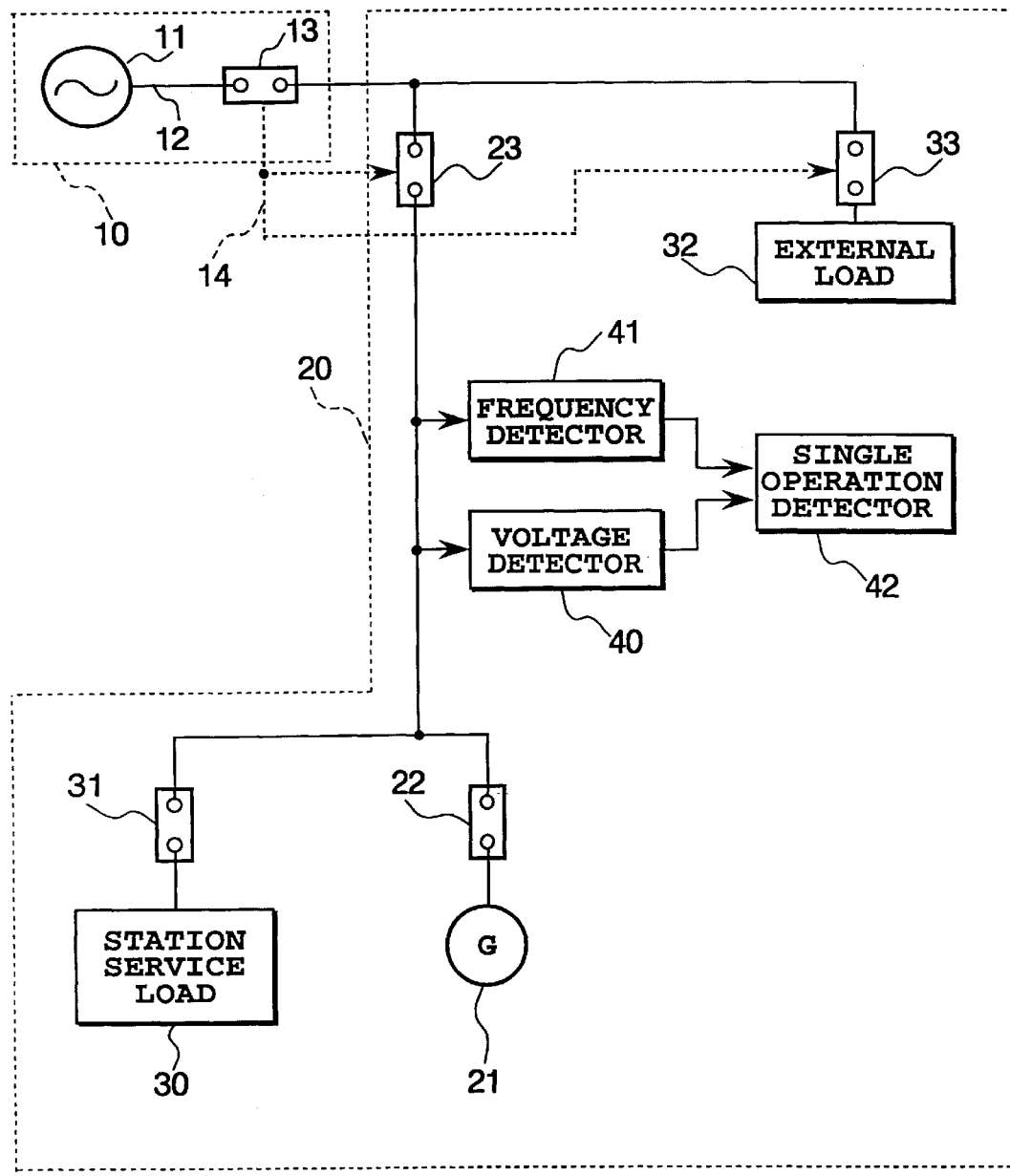
FIGS. 8A and 8B are block diagrams showing two examples of a conventional single operation detecting apparatus for a synchronous generator.
Figure 8B:
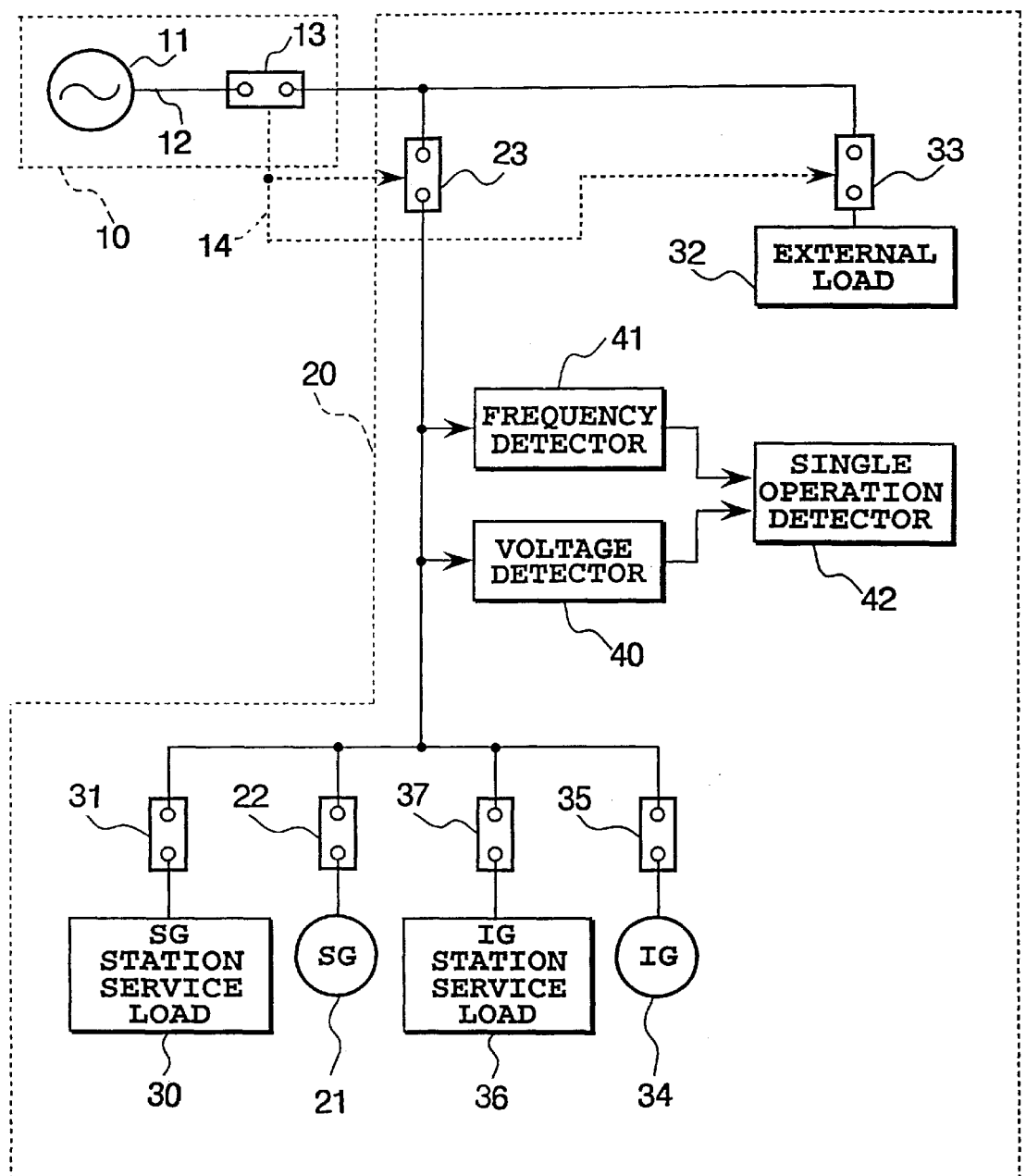

FIG. 1A is a block diagram showing a first example of a first embodiment of a single operation detecting apparatus for a distributed power supply in accordance with the present invention, in which the distributed power supply comprises a synchronous generator 21. Like portions to those of the conventional single operation detecting apparatuses shown in FIGS. 8A and 8B are designated by the same reference numerals, and the description thereof will be omitted here.

In FIG. 1A, a single operation detecting apparatus for the synchronous generator 21 comprises reactive power regulating equipment 51, a fluctuation signal generator 53, and a single operation signal generator 54. The reactive power regulating equipment 51 is composed of a static reactive power compensator or an active filter apparatus, and is connected to the synchronous generator 21 through a circuit breaker 52 for the reactive power regulating equipment. The fluctuation signal generator 53 supplies periodic small fluctuations to a reactive power setter 51a in the reactive power regulating equipment 51. The single operation signal generator 54 includes comparators 54a and 54b and an OR gate 54c, which comparators 54a and 54b monitor the output of the frequency detector 41 connected to the line system or circuit system of the customer 20 to detect whether the output deviates from a range ($f_0 \pm f_1$) defined by an allowable lower limit and an allowable upper limit around a reference frequency fo equal to 50 Hz or 60 Hz. The frequency detector 41 may detect the frequency, for example, at the synchronous generator 21, or at the receiving end (meaning a customer to which electric power is supplied from the power system 10).

Figure 2:
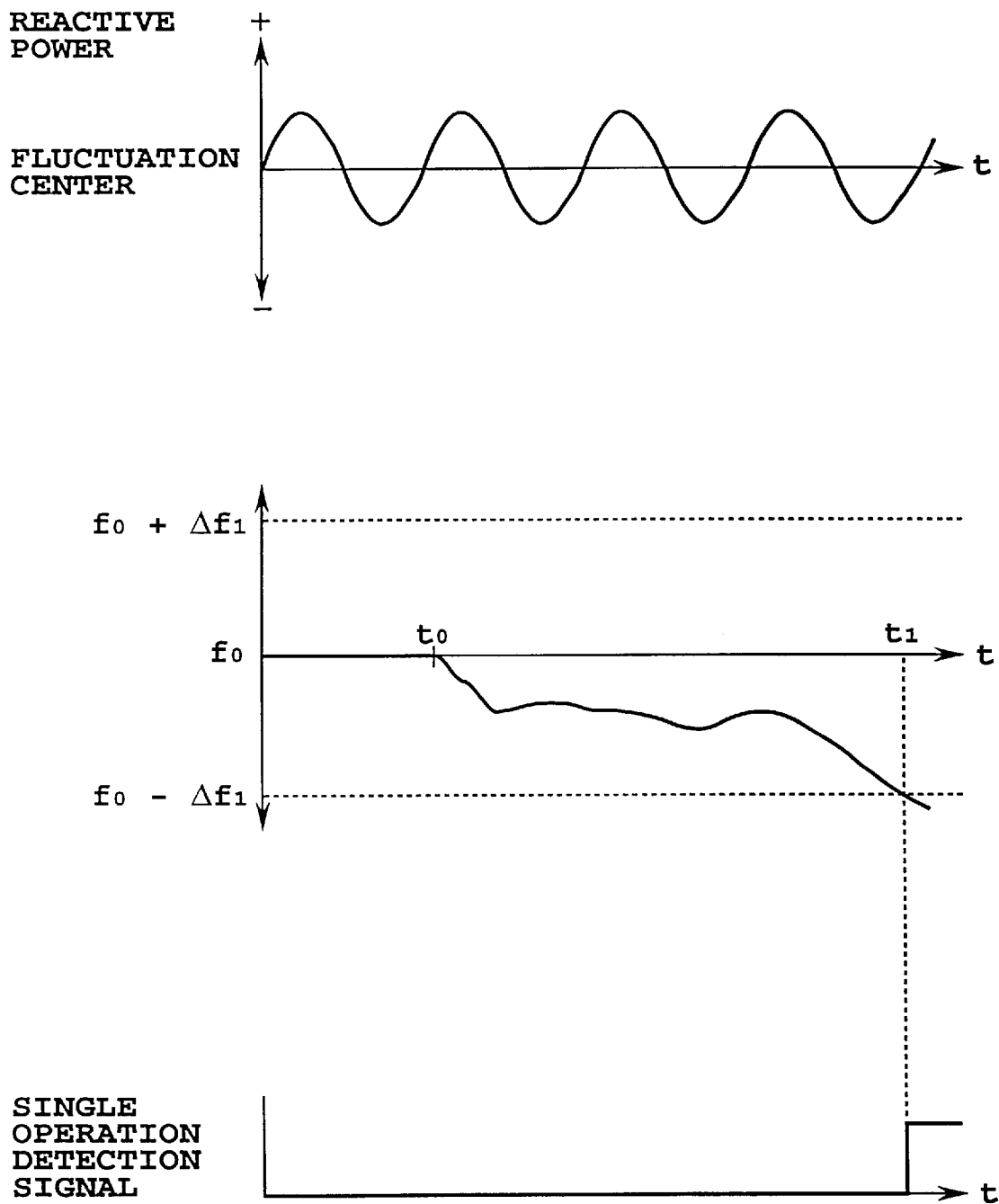
FIG. 2 is a diagram illustrating waveforms for explaining the operation of the first embodiment.

The detecting operation of the single operation detecting apparatus 50 in accordance with the example shown in FIG. 1A will now be described with reference to FIG. 2 illustrating waveforms of the operation.

The synchronous generator 21 enters into the isolated single operation mode if the commercial power system 10 is disconnected at time $t_0$ in FIG. 2 by the system circuit breaker 13 due to a failure or the like of the commercial power system 10, and the energy generated by the synchronous generator 21 is balanced with the power consumed by the station service load 30 and the external load 32. In this case, a frequency variation will occur during time $t_0$–$t_1$ as shown in FIG. 2, and at time $t_1$, the single operation signal generator 54 will output a single operation signal as shown in FIG. 2, if the fluctuation signal generator 53 and reactive power regulating equipment 51 are set such that they provide the line system of the customer 20 with lagging phase reactive power fluctuations during (+) polarity fluctuations, and with leading phase reactive power fluctuations during (−) polarity fluctuations.

Figure 1B:
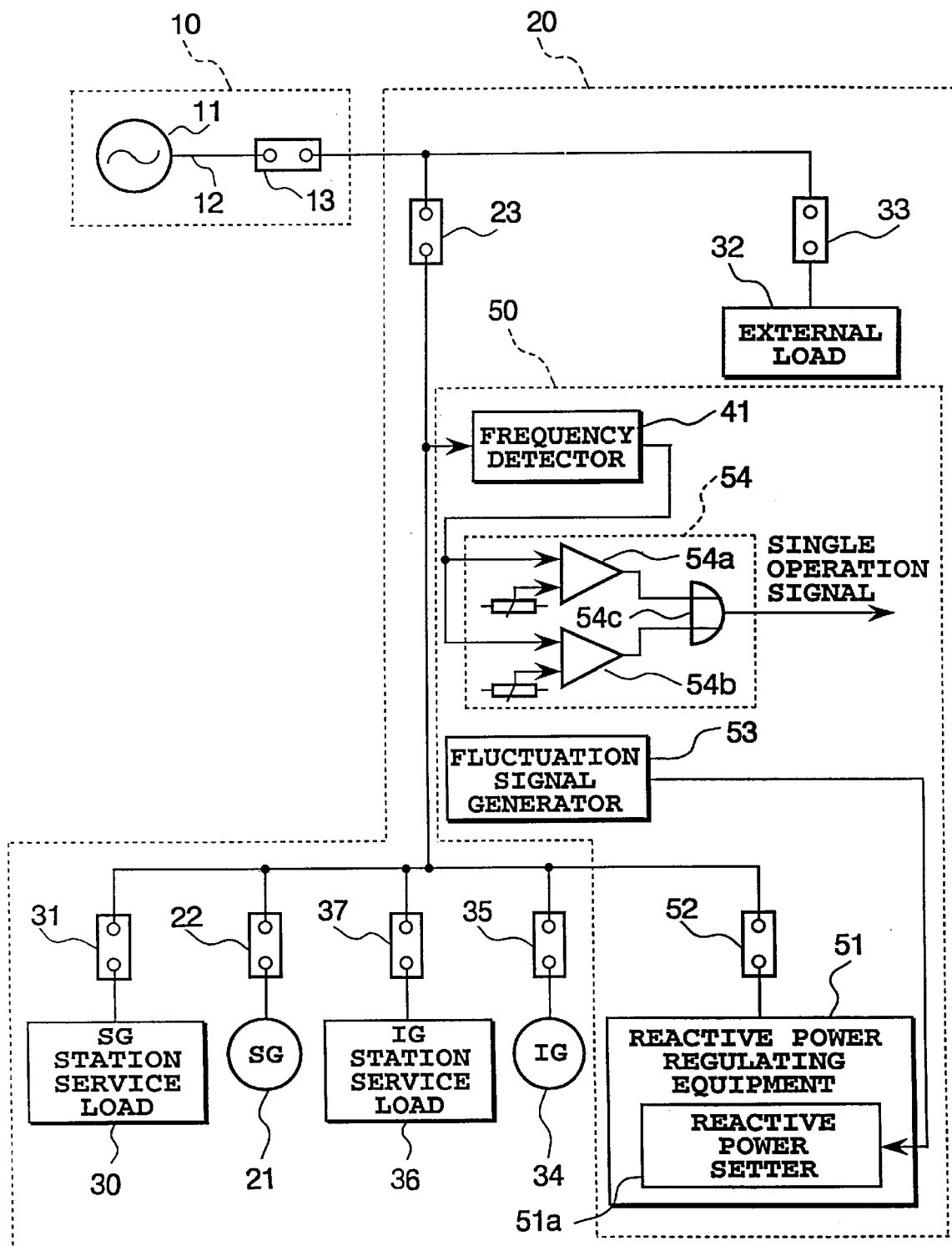

FIG. 1B is a block diagram showing a second example of the first embodiment of a single operation detecting apparatus for a distributed power supply in accordance with the present invention, in which like portions to those of the conventional single operation detecting apparatuses shown in FIGS. 8A and 8B are again designated by the same reference numerals, and the description thereof will be omitted here.

In FIG. 1B, a single operation detecting apparatus for a distributed power supply, which includes a synchronous generator 21 in addition to another power source such as an induction generator 34, comprises reactive power regulating equipment 51, a fluctuation signal generator 53 and a single operation signal generator 54. The reactive power regulating equipment 51 is composed of a static reactive power compensator or an active filter apparatus, and is connected to the induction generator 34 through a circuit breaker 52 for the reactive power regulating equipment. The fluctuation signal generator 53 supplies periodic small fluctuations to a reactive power setter 51a in the reactive power regulating equipment 51. The single operation signal generator 54 includes comparators 54a and 54b and an OR gate 54c, which comparators 54a and 54b monitor the output of the frequency detector 41 connected to the line system or circuit system of the customer 20 to detect whether the output deviates from a range ($f_0 \pm \Delta f_1$) defined by an allowable lower limit and an allowable upper limit around the reference frequency $f_0$ equal to 50 Hz or 60 Hz.

The detecting operation of the single operation detecting apparatus 50 in accordance with the example shown in FIG. 1B will now be described with reference again to FIG. 2 illustrating waveforms of the operation.

The distributed power supply composed of the induction generator 34 and synchronous generator 21 enters into the isolated or single operation mode if the commercial power system 10 is disconnected at time $t_0$ in FIG. 2 by the system circuit breaker 13 due to a failure or the like of the commercial power system 10. As a result, the energy generated by the induction generator 34 and synchronous generator 21 is balanced with the power consumed by the induction generator station service load 36, the synchronous generator station service load 30, and the external load 34. In this case, a frequency variation will occur during time $t_0$–$t_1$ as shown in FIG. 2, and at time $t_1$, the single operation signal generator 54 will output a single operation signal as shown in FIG. 2, if the fluctuation signal generator 53 and reactive power regulating equipment 51 are set such that they provide the line system of the customer 20 with lagging phase reactive power fluctuations during (+) polarity fluctuations, and with leading phase reactive power fluctuations during (−) polarity fluctuations.

EMBODIMENT 2

Figure 3A:
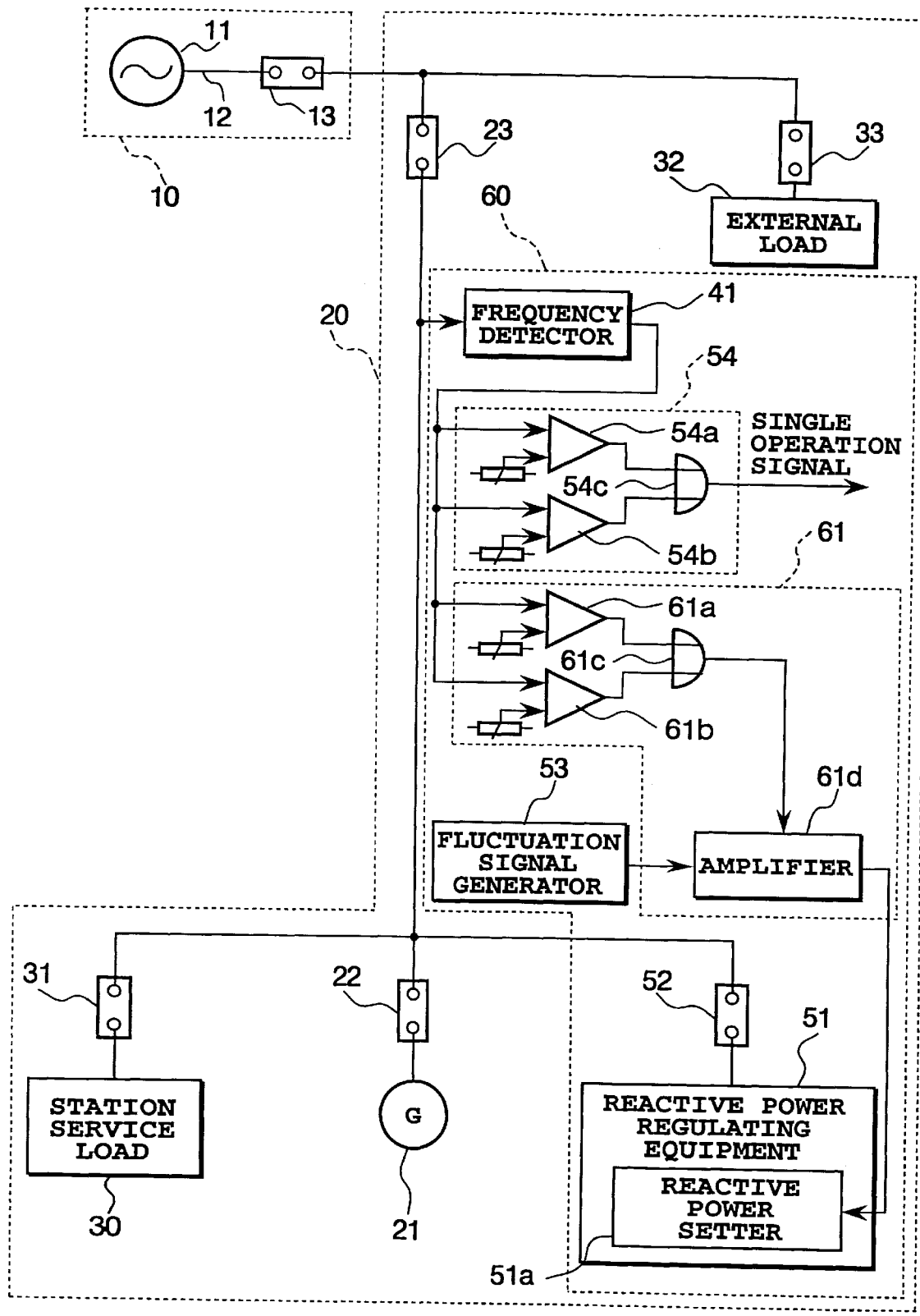
FIGS. 3A and 3B are block diagrams showing two examples of a second embodiment of a single operation detecting apparatus in accordance with the present invention.

FIG. 3A is a block diagram showing a first example of a second embodiment of the single operation detecting apparatus for a distributed power supply in accordance with the present invention, in which the distributed power supply comprises the synchronous generator 21. Portions similar to those of the single operation detecting apparatuses shown in FIGS. 1A and 1B are again designated by the same reference numerals, and the description thereof will be omitted.

In FIG. 3A, the single operation detecting apparatus 60 for the synchronous generator 21 comprises the frequency detector 41, reactive power regulating equipment 51, the circuit breaker 52 for the reactive power regulating equipment, fluctuation signal generator 53, single operation signal generator 54 and an amplifier circuit 61. The amplifier circuit 61 (which includes comparators 61a and 61b, an OR gate 61c and an amplifier 61d) monitors the output of the frequency detector 41, and amplifies the output of the fluctuation signal generator 53 when the monitored output deviates from a range ($f_0 \pm \Delta f_2$, where $\delta f_2 < \Delta f_1$) defined by an allowable lower limit and an allowable upper limit around the reference frequency $f_0$.

The amplifier circuit 61 of the single operation detecting apparatus 60 as shown in FIG. 3A enables the single operation to be detected quickly.

Figure 4:
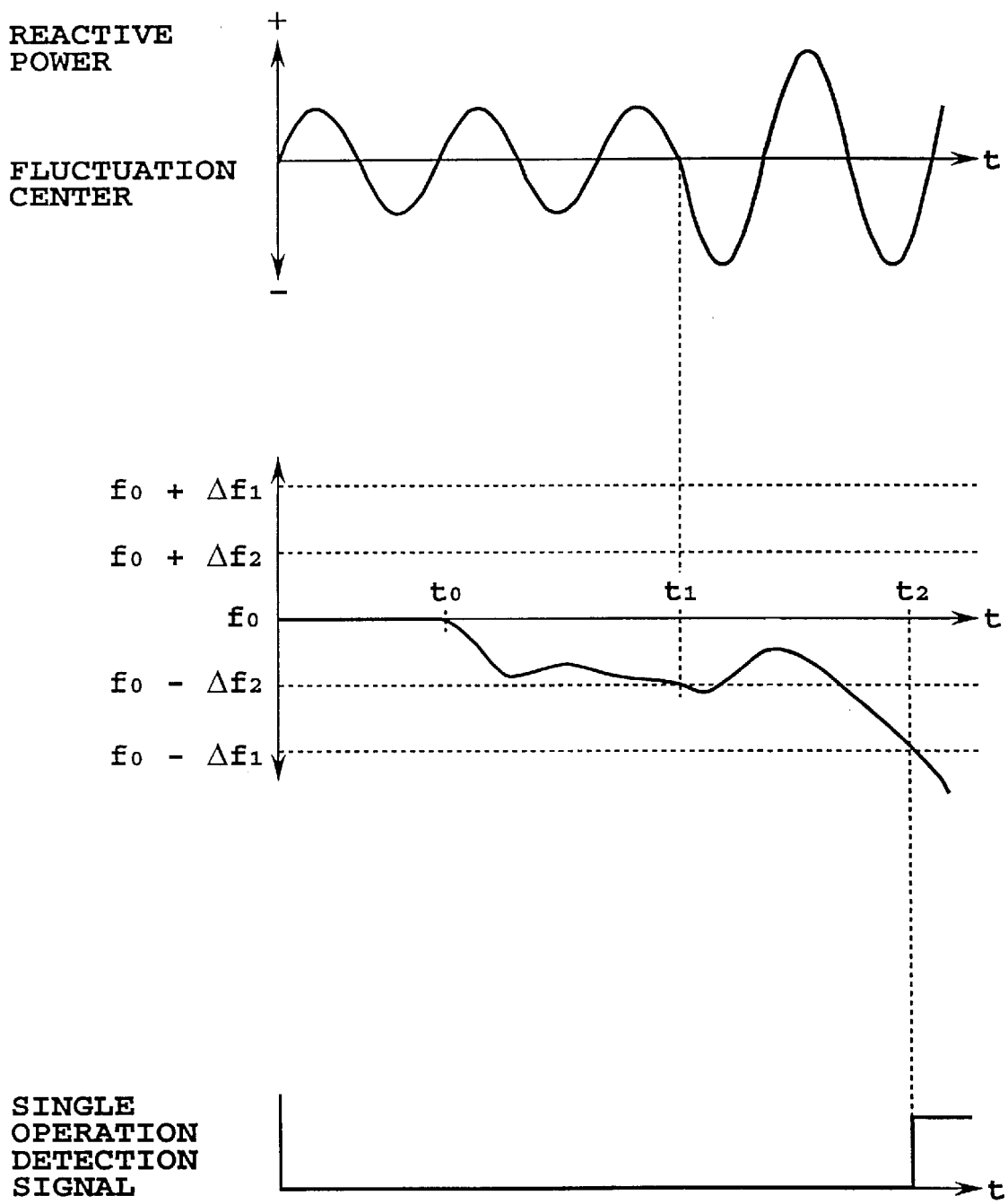
FIG. 4 is a diagram illustrating waveforms for explaining the operation of the second embodiment.

The detecting operation of the single operation detecting apparatus 60 in accordance with the example shown in FIG. 3A will now be described with reference to FIG. 4, illustrating waveforms of the operation.

The synchronous generator 21 enters into the single operation if the commercial power system 10 is disconnected at time $t_0$ in FIG. 4 by the system circuit breaker 13 due to a failure or the like of the commercial power system 10, under the condition that the energy generated by the synchronous generator 21 is balanced with the power consumed by the station service load 30 and the external load 32. In this case, a frequency variation will occur during time $t_0$–$t_1$ as shown in FIG. 4, and at time $t_1$, the amplifier circuit 61 will start to amplify the output of the fluctuation signal generator 53, resulting in an increase of the reactive power fluctuations as shown in FIG. 4. The single operation signal generator 54 will output a single operation signal at time $t_2$ as shown in FIG. 4, if the fluctuation signal generator 53, the amplifier circuit 61, and the reactive power regulating equipment 51 are set such that they provide the line system of the customer 20 with lagging phase reactive power fluctuations during (+) polarity fluctuations, and with leading phase reactive power fluctuations during (−) polarity fluctuations as in FIG. 2.

Figure 3B:
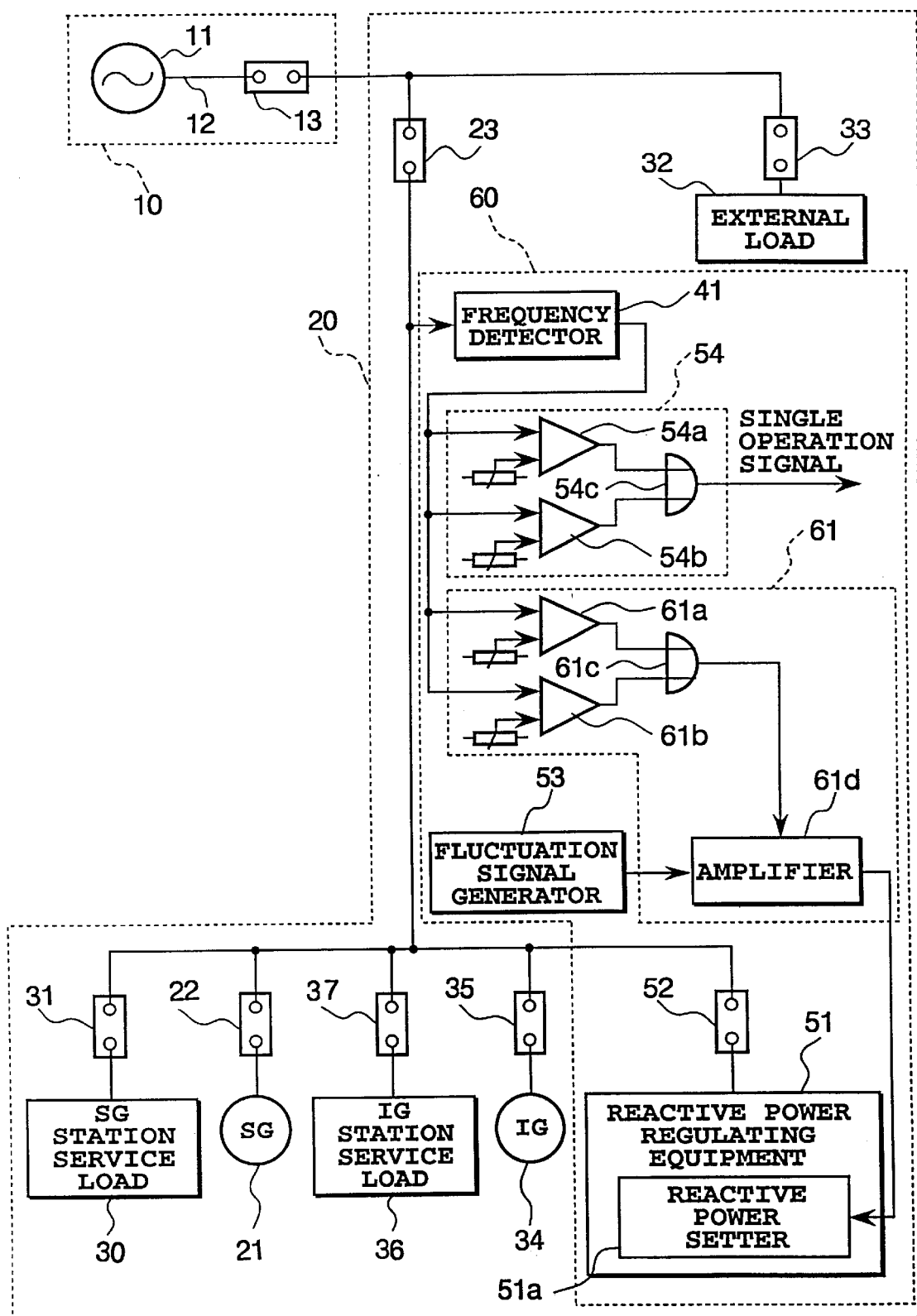

FIG. 3B is a block diagram showing a second example of the single operation detecting apparatus for a distributed power supply in accordance with the second embodiment of the present invention, in which portions similar to those of the single operation detecting apparatuses as shown in FIGS. 1A and 1B are designated by the same reference numerals, and the description thereof will be omitted here.

In FIG. 3B, the single operation detecting apparatus 60 for a distributed power supply which includes an induction generator 34 and synchronous generator 21 comprises the frequency detector 41, reactive power regulating equipment 51, the circuit breaker 52 for the reactive power regulating equipment, fluctuation signal generator 53, single operation signal generator 54 and the amplifier circuit 61. The amplifier circuit 61 (including comparators 61a and 61b, OR gate 61c, and the amplifier 61d) monitors the output of the frequency detector 41, and amplifies the output of the fluctuation signal generator 53 when the monitored output deviates from a range ($f_0 \pm \Delta f_2$, where $\Delta f_2 < \Delta f_1$) defined by allowable lower and upper limits around the reference frequency $f_0$.

The amplifier circuit 61 of the single operation detecting apparatus 60 as shown in FIG. 3B enables the single operation to be detected quickly.

The detecting operation of the single operation detecting apparatus 60 in accordance with the example shown in FIG. 3B will now be described with reference again to FIG. 4, illustrating waveforms of the operation.

The distributed power supply composed of the induction generator 34 and the synchronous generator 21 enters into the single operation mode if the commercial power system 10 is disconnected at time $t_0$ in FIG. 4 by the system circuit breaker 13 due to a failure or the like of the commercial power system 10. As a result, the energy generated by the induction generator 21 and synchronous generator 23 is balanced with the power consumed by the induction generator station service load 36, the synchronous generator station service load 30, and the external load 34. In this case, a frequency variation will occur during time $t_0$–$t_1$ as shown in FIG. 4, and at time $t_1$, the amplifier circuit 61 will start to amplify the output of the fluctuation signal generator 53, resulting in an increase of the reactive power fluctuations as shown in FIG. 4, and the single operation signal generator 54 will output a single operation signal at time $t_2$ as shown in FIG. 4, if the fluctuation signal generator 53, amplifier circuit 61, and reactive power regulating equipment 51 are set such that they provide the line system of the customer 20 with lagging phase reactive power fluctuations during (+) polarity fluctuations, and with leading phase reactive power fluctuations during (−) polarity fluctuations as in FIG. 2.

EMBODIMENT 3

Figure 5A:
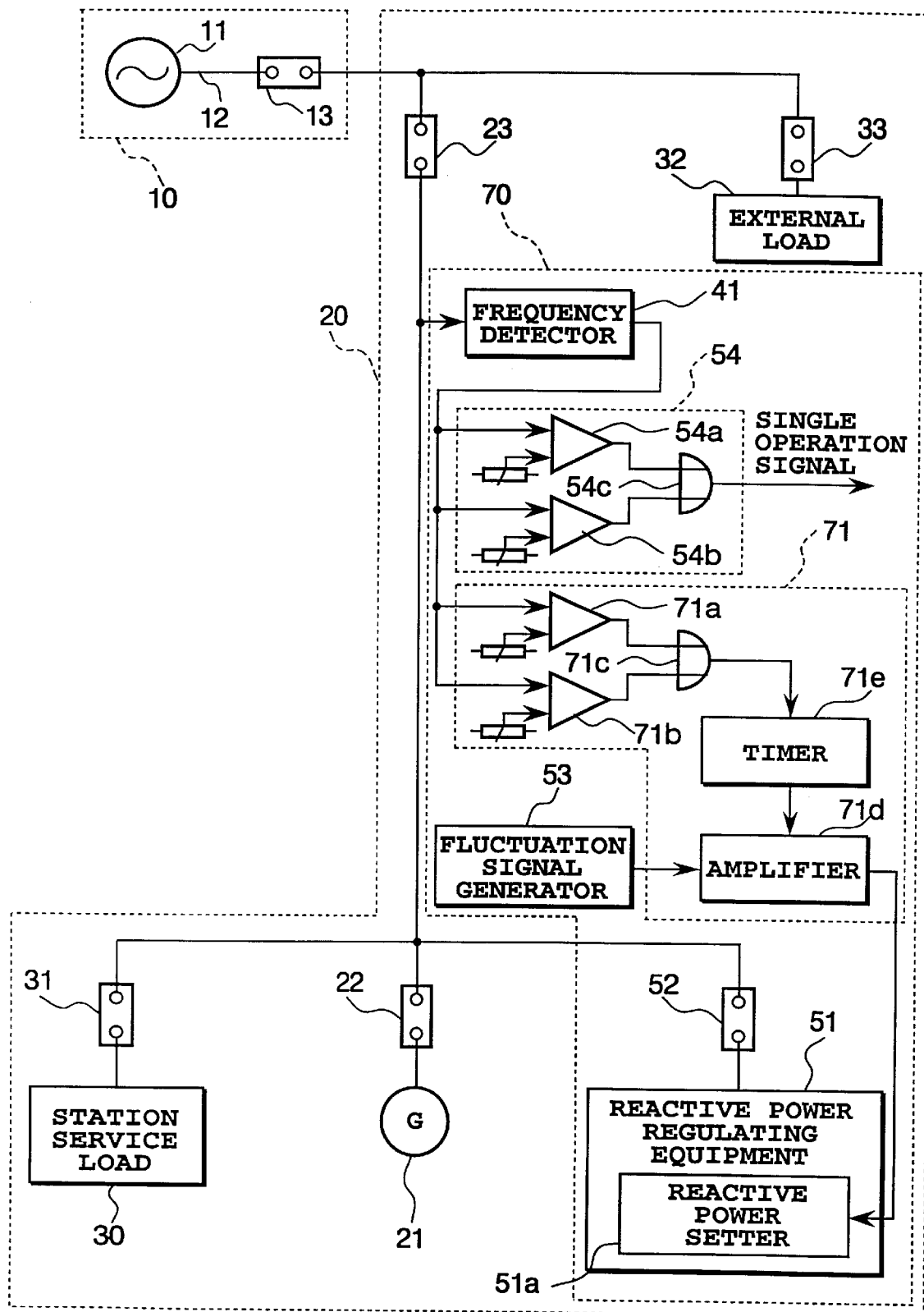
FIGS. 5A and 5B are block diagrams showing two examples of a third embodiment of the single operation detecting apparatus in accordance with the present invention.

FIG. 5A is a block diagram showing a first example of a single operation detecting apparatus for a distributed power supply in accordance with a third embodiment of the present invention, in which the distributed power supply comprises the synchronous generator 21. Portions similar to those of the single operation detecting apparatuses as shown in FIGS. 1A and 1B are again designated by the same reference numerals, and the description thereof will be omitted.

In FIG. 5A, the single operation detecting apparatus 70 for the synchronous generator 21 comprises the frequency detector 41, reactive power regulating equipment 51, the circuit breaker 52 for the reactive power regulating equipment, fluctuation signal generator 53, single operation signal generator 54 and a delay amplifier circuit 71. The delay amplifier circuit 71 (including comparators 7a and 7b, an OR gate 71c, an amplifier 71d, and a timer 71e) monitors the output of the frequency detector 41, activates the timer 71e when the monitored output deviates from a range ($f_0 \pm \Delta f_2$, where $\Delta f_2 < \Delta f_1$) between allowable lower and upper limits around the reference frequency $f_0$, and starts to amplify the output of the fluctuation signal generator 53 when the timer counts a predetermined time period $T_0$.

The delay amplifier circuit 71 of the single operation detecting apparatus 70 enables the single operation to be detected quickly while preventing the error detection thereof.

Figure 6:
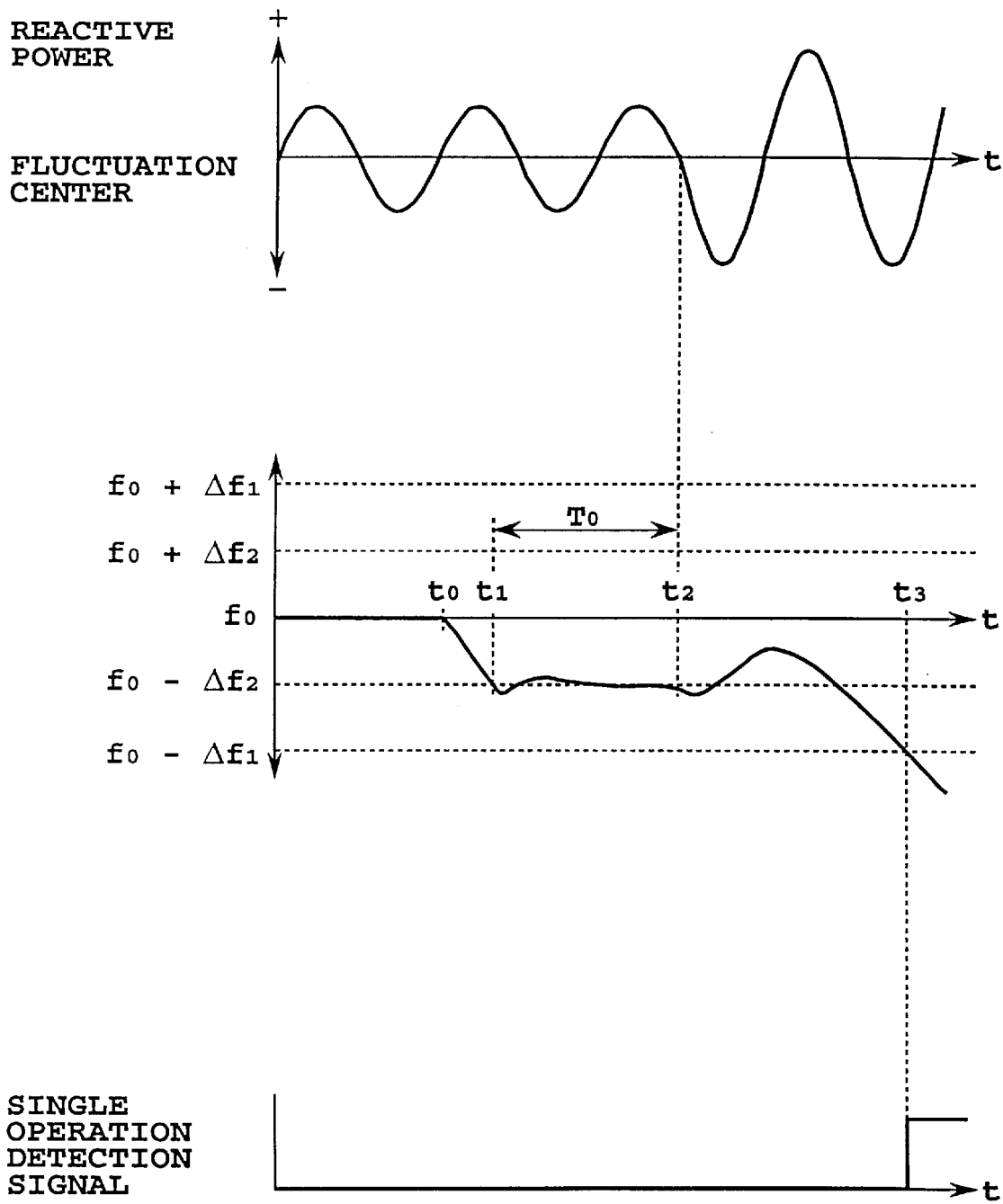
FIG. 6 is a diagram illustrating waveforms for explaining the operation of the third embodiment.

The detecting operation of the single operation detecting apparatus 70 in accordance with the present example as shown in FIG. 5A will now be described with reference to FIG. 6, illustrating waveforms of the operation.

The synchronous generator 21 enters into the isolated or single operation mode if the commercial power system 10 is disconnected at time $t_0$ in FIG. 6 by the system breaker 13 due to a failure or the like of the commercial power system 10, under the condition that the energy generated by the synchronous generator 21 is balanced with the power consumed by the station service load 30 and the external load 32. In this case, a frequency variation will occur during time $t_0$–$t_1$ as shown in FIG. 6, and at time $t_1$, the timer 71e is activated so that the amplifier 71d starts to amplify the output of the fluctuation signal generator 53 when the timer 71e counts the time period $T_0$, resulting in an increase of the reactive power fluctuations as shown in FIG. 6. The single operation signal generator 54 will output a single operation signal at time $t_3$ as shown in FIG. 6, if the fluctuation signal generator 53, the delay amplifier circuit 71, and the reactive power regulating equipment 51 are set such that they provide the line system of the customer 20 with lagging phase reactive power fluctuations during (+) polarity fluctuations, and with leading phase reactive power fluctuations during (−) polarity fluctuations as in FIG. 2.

Figure 5B:
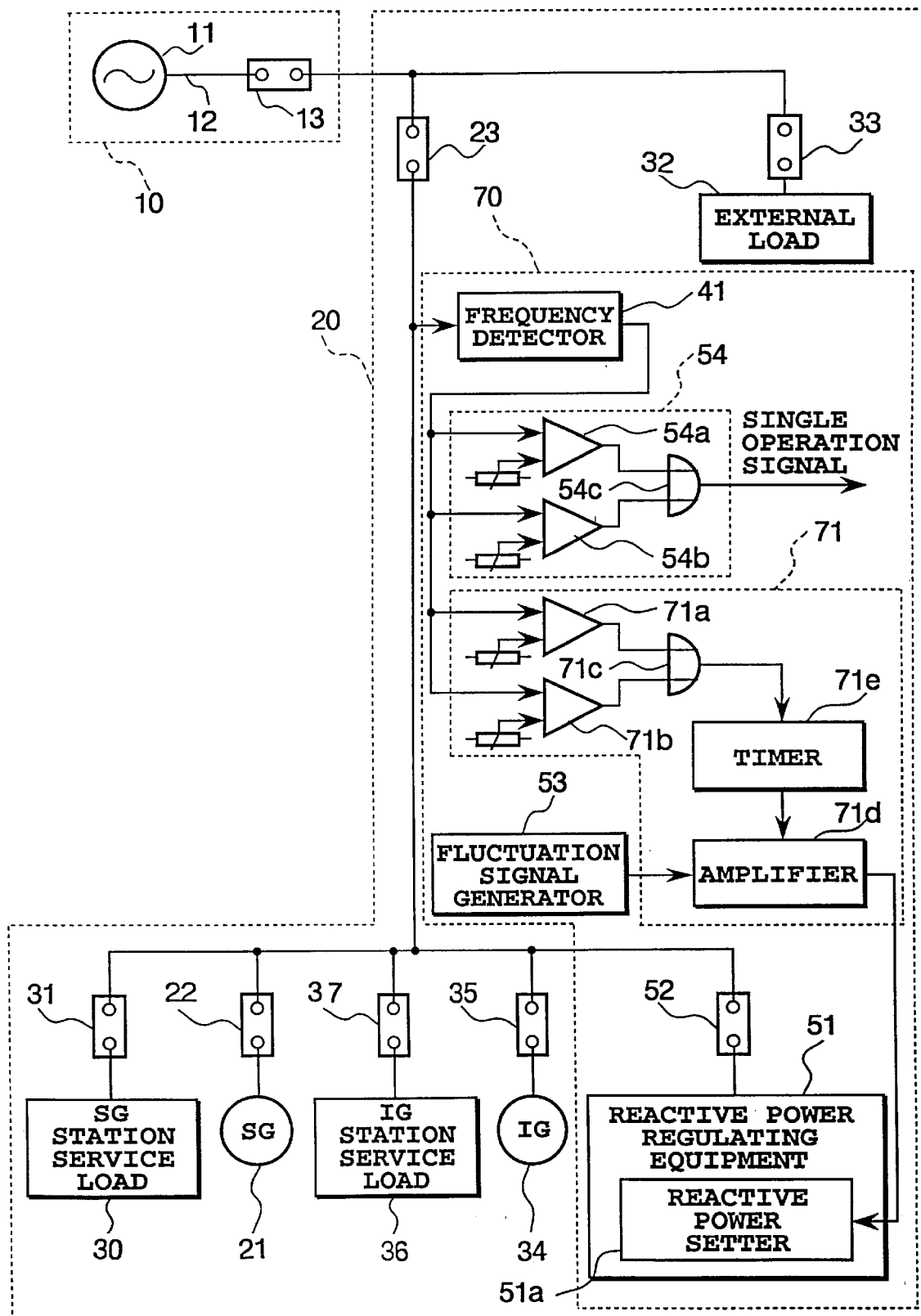

FIG. 5B is a block diagram showing a second example of a single operation detecting apparatus for a distributed power supply in accordance with the third embodiment of the present invention, in which portions similar to those of the single operation detecting apparatuses shown in FIGS. 1A and 1B are designated by the same reference numerals, and the description thereof will be omitted.

In FIG. 5B, the single operation detecting apparatus 70 for a distributed power supply which includes an induction generator 34 in addition to the synchronous generator 21 comprises the frequency detector 41, reactive power regulating equipment 51, the circuit breaker 52 for the reactive power regulating equipment, fluctuation signal generator 53, single operation signal generator 54 and a delay amplifier circuit 71. The delay amplifier circuit 71 (including comparators 71 and 71b, an OR gate 71c, an amplifier 71d, and a timer 71e) monitors the output of the frequency detector 41, activates the timer 71e when the monitored output deviates from a range ($f_0 \pm \Delta f_2$, where $\Delta f_2 < \Delta f_1$) between allowable lower and upper limits around the reference frequence $f_0$, and starts to amplify the output of the fluctuation signal generator 53 when the timer counts a predetermined time period $T_0$.

The delay amplifier circuit 71 of the single operation detecting apparatus in this example enables the isolated or single operation mode to be detected quickly while preventing the error detection thereof.

The detection operation of the single operation detecting apparatus 70 in accordance with the present example as shown in FIG. 5B will now be described with reference again to FIG. 6 illustrating waveforms of the operation.

The distributed power supply, composed of the induction generator 34 and the synchronous generator 21, enters into the single operation mode if the commercial power system 10 is disconnected at time $t_0$ in FIG. 6 by the system breaker 13 due to a failure or the like of the commercial power system 10. As a result, the energy generated by the induction generator 34 and synchronous generator 21 is balanced with the power consumed by the induction generator station service load 36, the synchronous generator station service load 30, and the external load 34. In this case, a frequency variation will occur during the time $t_0-t_1$ as shown in FIG. 6, and at time $t_1$, the timer 71e is activated so that the amplifier 71d starts to amplify the output of the fluctuation signal generator 53 when the timer 71e counts the time period $T_0$, resulting in an increase of the reactive power fluctuations as shown in FIG. 6. The single operation signal generator 54 will output a single operation signal at time $t_3$ as shown in FIG. 6, if the fluctuation signal generator 53, the delay amplifier circuit 71, and the reactive power regulating equipment 51 are set such that they provide the line system of the customer 20 with lagging phase reactive power fluctuations during (+) polarity fluctuations, and with leading phase reactive power fluctuations during (−) polarity fluctuations as in FIG. 2.

EMBODIMENT 4

Figure 7A:
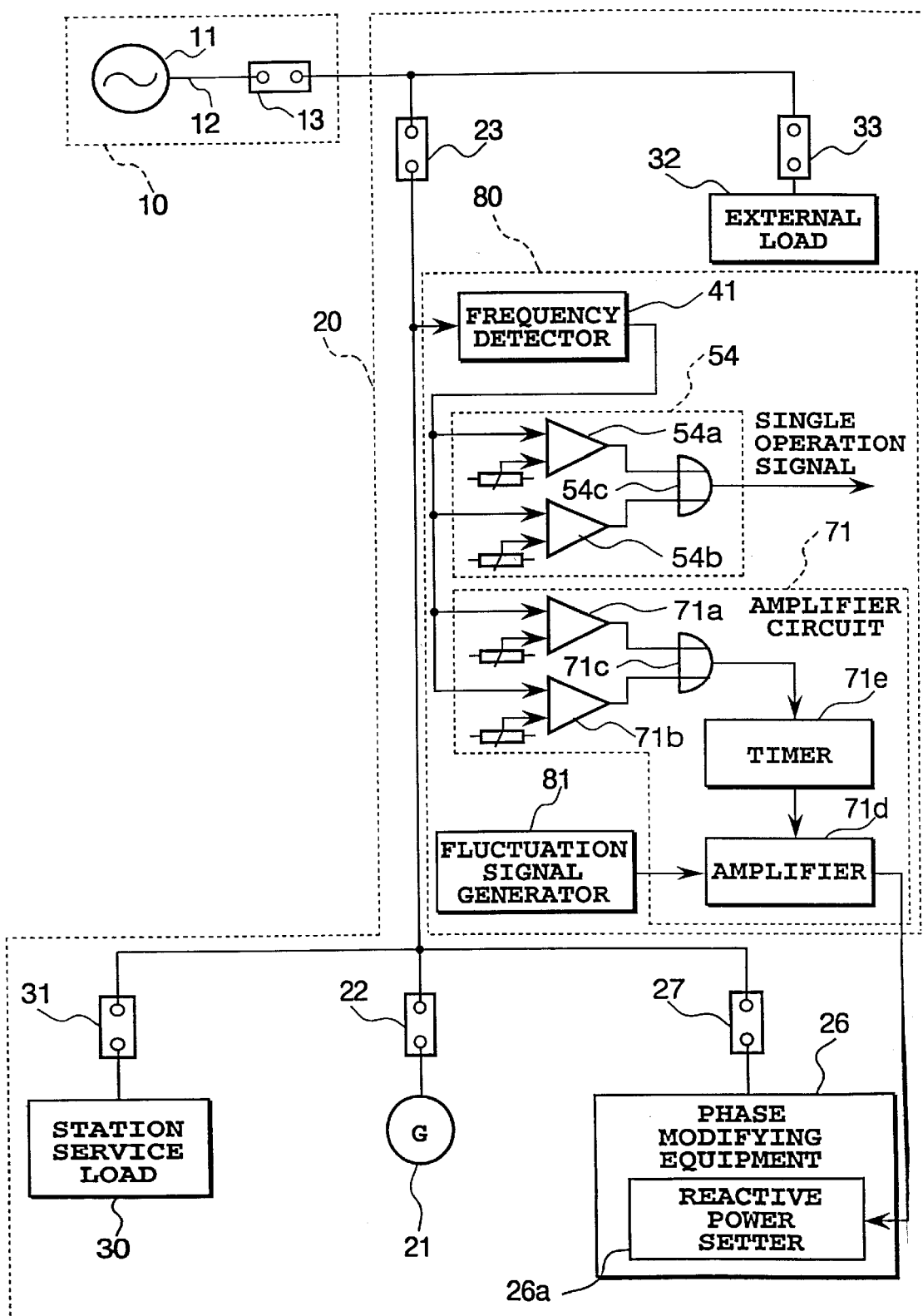
FIGS. 7A and 7B are block diagrams showing two examples of a fourth embodiment of a single operation detecting apparatus in accordance with the present invention.

FIG. 7A is a block diagram showing a first example of a single operation detecting apparatus for a distributed power supply in accordance with a fourth embodiment of the present invention, in which the distributed power supply comprises the synchronous generator 21. Portions similar to those of the single operation detecting apparatuses as shown in FIGS. 5A and 5B are designated by the same reference numerals, and the description thereof will be omitted here.

In FIG. 7A, phase modifying equipment 26, such as a synchronous phase modifier or a reactive power compensator, is connected to the line system of the customer 20 via the circuit breaker 27 for the phase modifying equipment, so that it serves for improving the power factor of the system and the stability of the synchronous generator. In this case, a single operation detecting apparatus 80 provides the periodic small fluctuations to the reactive power setter 26a of the phase modifying equipment 24, so that it detects the single operation mode of the synchronous generator 21.

The single operation detecting apparatus 80 as shown in FIG. 7A comprises the frequency detector 41, the single operation signal generator 54, the delay amplifier circuit 71 and a fluctuation signal generator 81, and operates in the same manner as the single operation detecting apparatus 70 described in connection with FIG. 5A.

Figure 7B:
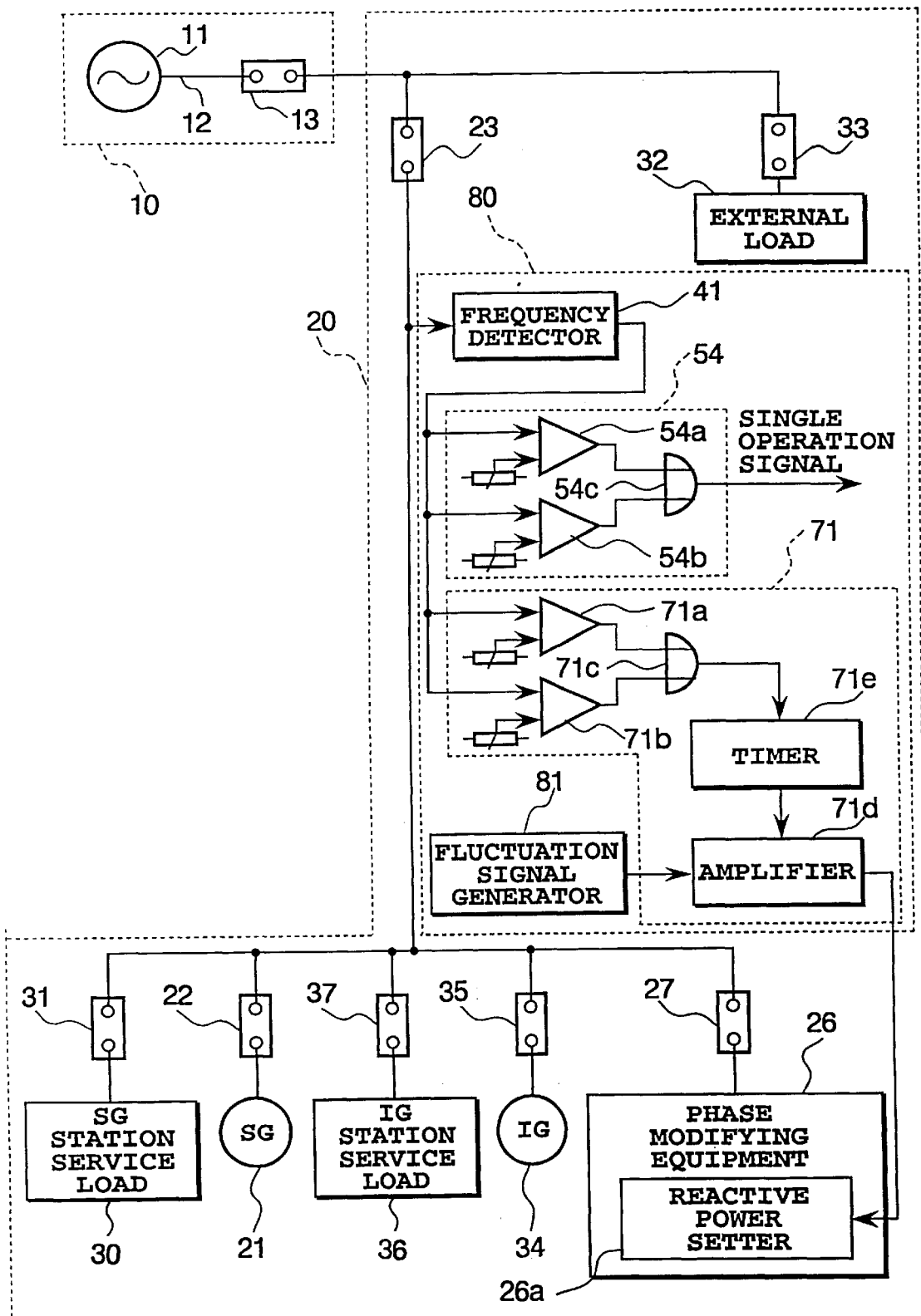

FIG. 7B is a block diagram showing a second example of a single operation detecting apparatus for a distributed power supply in accordance with the fourth embodiment of the present invention, in which the distributed power supply also includes another power source, such as the induction generator 34, in addition to the synchronous generator 21. Portions similar to those of the single operation detecting apparatuses shown in FIGS. 5A and 5B are designated by the same reference numerals, and the description thereof will be omitted here.

In FIG. 7B, phase modifying equipment 26, such as a synchronous phase modifier or a reactive power compensator, is connected to the line system of the customer 20 via the circuit breaker 27 for the phase modifying equipment, so that it serves for improving the power factor of the system and the stability of the distributed power supply. The single operation detecting apparatus 80 provides the periodic small fluctuations to the reactive power setter 26a of the phase modifying equipment 26, so that it detects the single operation of the distributed power supply composed of the induction generator 34 and the synchronous generator 21.

The present invention has been described in detail with respect to various embodiments, and it will now be apparent from the foregoing to those skilled in the art that changes and modifications may be made without deviating from the invention in its broader aspects, and it is the intention, therefore, in the appended claims to cover all such changes and modifications as fall within the true spirit of the invention.

What is claimed is:

1. A single operation detecting apparatus for detecting entry of a distributed power supply into single operation from cooperation of said distributed power supply with a power system, said distributed power supply including a synchronous generator, said single operation detecting apparatus comprising:

reactive power regulating equipment connected to said distributed power supply, said reactive power regulating equipment including a reactive power setter;

a fluctuation signal generator for providing said reactive power setter of said reactive power regulating equipment with periodic small fluctuations;

a frequency detector for detecting one of a frequency at a receiving end where electric power is received from said power system and a frequency of said distributed power supply; and a single operation signal generator for generating a single operation signal when a difference between an output of said frequency detector and a predetermined reference frequency deviates from a predetermined range, while said fluctuation signal generator continually provides said small fluctuations to reactive power at said receiving end.

2. The single operation detecting apparatus as claimed in claim 1, wherein said reactive power regulating equipment includes a static reactive power compensator.

3. The single operation detecting apparatus as claimed in claim 1, wherein said reactive power regulating equipment includes an active filter apparatus.

4. The single operation detecting apparatus as claimed in claim 1, wherein said distributed power supply further comprises an additional power source operating in parallel with said synchronous generator.

5. The single operation detecting apparatus as claimed in claim 4, wherein the additional power source is an induction generator.

6. A single operation detecting apparatus for detecting entry of a distributed power supply into single operation from cooperation of said distributed power supply with a power system, said distributed power supply including a synchronous generator, said single operation detecting apparatus comprising:

reactive power regulating equipment connected to said distributed power supply, said reactive power regulating equipment including a reactive power setter;

a fluctuation signal generator for providing said reactive power setter of said reactive power regulating equipment with periodic small fluctuations;

a frequency detector for detecting one of a frequency at a receiving end where electric power is received from said power system and a frequency of said distributed power supply;

an amplifier circuit for monitoring small fluctuations in an output of said frequency detector, and for amplifying an output of said fluctuation signal generator for a predetermined short duration when the output of said frequency detector deviates from a range between predetermined upper and lower limits; and a single operation signal generator for generating a single operation signal when a difference between the output of said frequency detector and a predetermined reference frequency deviates from a predetermined range, while said amplifier circuit and said fluctuation signal generator continually provide said small fluctuations to reactive power at said receiving end.

7. The single operation detecting apparatus as claimed in claim 6, wherein said reactive power regulating equipment includes a static reactive power compensator.

8. The single operation detecting apparatus of the distributed power supply as claimed in claim 6, wherein said reactive power regulating equipment includes an active filter apparatus.

9. The single operation detecting apparatus as claimed in claim 6, wherein said distributed power supply further comprises an additional power source operating in parallel with said synchronous generator.

10. The single operation detecting apparatus as claimed in claim 9, wherein the additional power source is an induction generator.

11. A single operation detecting apparatus for detecting entry of a distributed power supply into single operation from cooperation of said distributed power supply with a power system, said distributed power supply including a synchronous generator, said single operation detecting apparatus comprising:

reactive power regulating equipment connected to said distributed power supply, said reactive power regulating equipment including a reactive power setter;

a fluctuation signal generator for providing said reactive power setter of said reactive power regulating equipment with periodic small fluctuations;

a frequency detector for detecting one of a frequency at a receiving end where electric power is received from said power system and a frequency of said distributed power supply;

a delay amplifier circuit for monitoring small fluctuations in an output of said frequency detector, for activating a timer when the output of said frequency detector deviates from a range between predetermined upper and lower limits, and for amplifying an output of said fluctuation signal generator for a predetermined short duration when said timer counts a predetermined time period; and a single operation signal generator for generating a single operation signal when a difference between the output of said frequency detector and a predetermined reference frequency deviates from a predetermined range, while said delay amplifier circuit and said fluctuation signal generator continually provide said small fluctuations to reactive power at said receiving end.

12. The single operation detecting apparatus as claimed in claim 11, wherein said reactive power regulating equipment includes a static reactive power compensator.

13. The single operation detecting apparatus as claimed in claim 11, wherein said reactive power regulating equipment includes an active filter apparatus.

14. The single operation detecting apparatus as claimed in claim 11, wherein said distributed power supply further comprises an additional power source operating in parallel with said synchronous generator.

15. The single operation detecting apparatus as claimed in claim 14, wherein the additional power source is an induction generator.

16. A single operation detecting apparatus for detecting entry of a distributed power supply into single operation from cooperation of said distributed power supply with a power system, said distributed power supply including a synchronous generator, said single operation detecting apparatus comprising:

phase modifying equipment connected to said distributed power supply, said phase modifying equipment including a reactive power setter;

a fluctuation signal generator for providing said reactive power setter of said phase modifying equipment with periodic small fluctuations;

a frequency detector for detecting one of a frequency at a receiving end where electric power is received from said power system and a frequency of said distributed power supply; and a single operation signal generator for generating a single operation signal when a difference between an output of said frequency detector and a predetermined reference frequency deviates from a predetermined range, while said fluctuation signal generator continually provides said small fluctuations to reactive power at said receiving end.

17. The single operation detecting apparatus as claimed in claim 16, wherein said distributed power supply further comprises an additional power source operating in parallel with said synchronous generator.

18. The single operation detecting apparatus as claimed in claim 17, wherein the additional power source is an induction generator.

19. A single operation detecting apparatus for detecting entry of a distributed power supply into single operation from cooperation of said distributed power supply with a power system, said distributed power supply including a synchronous generator, said single operation detecting apparatus comprising:

phase modifying equipment connected to said distributed power supply, said phase modifying equipment including a reactive power setter;

a fluctuation signal generator for providing said reactive power setter of said phase modifying equipment with periodic small fluctuations;

a frequency detector for detecting one of a frequency at a receiving end where electric power is received from said power system and a frequency of said distributed power supply;

an amplifier circuit for monitoring small fluctuations in an output of said frequency detector, and for amplifying an output of said fluctuation signal generator for a predetermined short duration when the output of said frequency detector deviates from a range between predetermined upper and lower limits; and a single operation signal generator for generating a single operation signal when a difference between the output of said frequency detector and a predetermined reference frequency deviates from a predetermined range, while said amplifier circuit and said fluctuation signal generator continually provide said small fluctuations to reactive power at said receiving end.

20. The single operation detecting apparatus as claimed in claim 19, wherein said distributed power supply further comprises an additional power source operating in parallel with said synchronous generator.

21. The single operation detecting apparatus as claimed in claim 20, wherein the additional power source is an induction generator.

22. A single operation detecting apparatus for detecting entry of a distributed power supply into single operation from cooperation of said distributed power supply with a power system, said distributed power supply including a synchronous generator, said single operation detecting apparatus comprising:

phase modifying equipment connected to said distributed power supply, said phase modifying equipment including a reactive power setter;

a fluctuation signal generator for providing said reactive power setter of said phase modifying equipment with period small fluctuations;

a frequency detector for detecting one of a frequency at a receiving end where electric power is received from said power system and a frequency of said synchronous generator;

a delay amplifier circuit for monitoring small fluctuations in an output of said frequency detector, for activating a timer when the output of said frequency detector deviates from a range between predetermined upper and lower limits, and for amplifying an output of said fluctuation signal generator for a predetermined short duration when said timer counts a predetermined time period; and a single operation signal generator for generating a single operation signal when a difference between the output of said frequency detector and a predetermined reference frequency deviates from a predetermined range, while said delay amplifier circuit and said fluctuation signal generator continually provide said small fluctuations to reactive power at said receiving end.

23. The single operation detecting apparatus as claimed in claim 22, wherein said distributed power supply further comprises an additional power source operating in parallel with said synchronous generator.

24. The single operation detecting apparatus as claimed in claim 23, wherein the additional power source is an induction generator.

* * * * *

UNITED STATES PATENT AND TRADEMARK OFFICE
CERTIFICATE OF CORRECTION

PATENT NO.    : 5,945,813
DATED         : August 31, 1999
INVENTOR(S)   : Kouji Kondou et al.

It is certified that error appears in the above-identified patent and that said Letters Patent is hereby corrected as shown below:

Title page,
Item [73], should be -- Assignees: Tokyo Electric Power Co., Inc., Tokyo; Fuji Electric Co., Ltd., Kanagawa, both of Japan. --

Signed and Sealed this

Sixth Day of November, 2001

Attest:

*Attesting Officer*

NICHOLAS P. GODICI
*Acting Director of the United States Patent and Trademark Office*